Patented Apr. 29, 1930

1,756,637

UNITED STATES PATENT OFFICE

ROBERT SEAVER EDWARDS, OF BROOKLINE, MASSACHUSETTS, ASSIGNOR TO RUMFORD CHEMICAL WORKS, OF PROVIDENCE, RHODE ISLAND, A CORPORATION OF RHODE ISLAND

METHOD OF PREPARING BY-PRODUCT CALCIUM SULPHATE FOR PLASTER

No Drawing. Application filed April 9, 1927. Serial No. 182,543.

My present invention relates to the utilization of such calcium sulphates as the by-product of acid manufacture, and particularly the manufacture of phosphoric acid. As the by-product of phosphoric acid presents a characteristic example of the possibilities of my invention, I will discuss it particularly as it is both illustrative of and as a specific phase of my invention of immediate value.

In the manufacture of phosphoric acid three raw materials are required, namely, rock phosphate, sulphuric acid and weak phosphoric acid liquor. These materials are called the reactants and are put together in certain specific proportions and under certain conditions so that the highest possible extraction or production of phosphoric acid results.

In the mechanical operations involved in the manufacture of phosphoric acid, it is necessary to use a sufficient amount of sulphuric acid and the weak phosphoric acid liquor to attack and completely dissolve the basic rock phosphate. The calculated amounts of combined acids can be controlled very closely, but sometimes this control borders on the basic side rather than on the acidic side for the purpose of further processing of the phosphoric acid. In other words, for mechanical reasons, in the actual operation of a phosphoric acid plant it is sometimes advisable to operate this plant on the basic side, that is having slightly more rock phosphate than the required amount of sulphuric acid to fully and completely dissolve the same. This is often done at an actual sacrifice of economy in the extraction of the phosphoric acid. Where the three named reactants are put together by continuous mixing and agitation, it is quite difficult to bring these reactants together in the correct manner or rather in the improved manner which will produce a needle or mono-clinic crystal form of gypsum. When this by-product gypsum from phosphoric acid manufacture is to be recovered and utilized as commercial plaster of Paris, difficulties arise in the processing of the gypsum so produced especially when the reactants required for producing phosphoric acid are brought together by continuous mixing and agitation on the basic side of the combination. When such by-product gypsum is treated by neutralization as in my previous Patent No. 1,548,358, and calcined into plaster of Paris, it is found that certain amounts of phosphoric acid and fluorine compounds are regenerated or made active by the temperature used in calcination.

The presence of these varying quantities of insoluble, semi-decomposed and soluble phosphoric acid compounds, as well as varying amounts of soluble and semi-soluble or decomposed fluorine compounds, or certain combinations of such salts, is especially noticeable when the method or methods of procedure of bringing together the reactants required for the manufacture of phosphoric acid have been carried on without due care as regards concentration, incorrect order of combining the reactants, and non-uniform control of quantities of weak phosphoric acid liquor used, sulphuric acid and phosphate rock required for correct balancing of acids and base. In such cases of lack of proper plant control or for other reasons, any or all of which may produce the conditions noted, the form of gypsum crystal is generally nodular or badly broken up and not of the approved mono-clinic, coarse and fine slab-like or needle gypsum crystal. These short or massive crystals of whatever origin or form I refer to as nodular to distinguish from the longer or needle like crystals. By the term nodular it is therefore to be understood that I mean all such short crystals.

In such cases it generally becomes necessary to perform a certain chemical treatment of this gypsum after preliminary washing over filter or by other means. While careful washing alone always reduces the directly water soluble impurities in such gypsum, such carefully washed gypsum upon drying and through process of calcining (by which it is subjected to 350 to 400° F. temperature) invariably will be found to contain certain water soluble acidulous impurities which were inherently present in the gypsum but required a certain degree of heat or temperature to convert or regenerate them from a water insoluble form to an active or water soluble form, in which latter condition they react with a weakening and retarding effect on the calcined plaster in which they occur, causing great reduction in strength, plasticity, and other qualities which go to make marketable commercial plaster of Paris. Also, in calcining such gypsum, even if treated by the usual methods of neutralization with sodium or other salts, these compounds regenerated into acid water soluble compounds by calcination temperature, are at least partially broken up with volatilization of acidulous gases which attack through corrosion the iron and steel of plaster kettles.

Chemical treatment of gypsum in such a physical condition as herein described by neutralization of the water soluble acidulous impurities present, with some form of sodium salt or other suitable neutralizing agent, only serves to take care of such acidulous impurities existing before calcination of the gypsum so treated. The recurring acidity due to the effect of heat of calcination on such gypsum is, therefore, not neutralized by such treatment, unless a considerable excess of the neutralizing agent is used. Such treatment can never be correctly gauged, nor the excess of the neutralizing agent to allow for this recurring or regenerated acidity, because there is no known way of determining what the exact percentage of this regenerated acidity will be without prior calcination of such gypsum.

Furthermore, as part of this regenerated acidity is due to the presence of semi-decomposed calcium fluoride or combination of some form of phosphoric acid-fluorine salt or some other fluorine compound, the addition of a sodium salt in excess may neutralize the acidulous phosphoric acid fluorine compound by converting it into a sodium salt of the phosphoric acid fluorine compound, which salt is very detrimental to the setting and hardening qualities of the resulting plaster.

In reclaiming gypsum of such physical and unstable chemical condition I have found it necessary to institute some positive method of chemical treatment whereby these impurities, both soluble, semi-soluble, and insoluble before calcination, will be broken down by further treatment with a strong mineral acid, entirely converting the semi-soluble, the basic and the partially acidulated particles of calcium phosphatic and calcium fluoride minerals, or combinations of these elements or any other fluorine compound into acidic water soluble matter and further precipitated gypsum. Then by means of neutralization I have found that it is possible to overcome this recurrence or regeneration of deleterious acidulous condition upon application of heat necessary for calcination.

In practice I have used sulphuric acid as the strong mineral acid, and some form of lime salt as the final neutralizing agent. My reason for such choice of acid is due to the fact that gypsum is a sulphuric acid salt of lime, and as many times, through natural processes, gypsum has been produced from the action of sulphurous acid gases upon carbonate of lime. At the same time sulphuric acid is the acid used for extracting phosphoric acid from tri-calcium phosphate and for evolution of hydro-fluoric acid from calcium fluoride ($CaF_2$). So that in treating gypsum residue of the physical and chemical composition as cited above, the sulphuric acid added to said residue in slight excess, while the residue is in thick slurry form, and heated, immediately attacks any basic, semi-basic and partially acted upon particles of fluoride in phosphatic combinations existing in the gypsum, and breaks them down into phosphoric acid, leaving also certain small amounts of free sulphuric acid and volatilization of some of the fluorine as hydro-fluoric acid gas.

The next step in this method of treatment is the neutralization of whatever small amount of phosphoric acid is liberated, together with the excess of sulphuric acid added. I have found by practical experiments that this is best accomplished by the addition of finely divided hydrated lime into the acidic gypsum magma, thereby almost instantaneously forming mono-calcium phosphate and precipitated gypsum, also bringing down any small but non-volatilized hydro-fluoric acid as calcium fluoride.

Gypsum from phosphoric acid manufacture treated by this "sulphuric acid-lime" chemical treatment shows a physical improvement in being of less viscous and more plastic physical form, which characteristic applies to the plaster made from such treated gypsum through the process of calcination.

Through this physical change the plaster manufactured by calcination of gypsum treated by this sulphuric acid-lime procedure has what is commercially known as more spread, that is, the covering capacity or sand carrying capacity becomes greater. This greater spread is particularly of value when plaster treated in this manner is to be converted into plaster blocks, for one ton of this plaster will produce a greater number of blocks than the plaster produced from calcining similar but untreated gypsum, or gypsum treated by ordinary methods of neutralization.

I have referred to the use of sulphuric acid as illustrative of a cheap and efficient mineral acid and this acid produces a very satisfactory normal plaster of general average utility. In some instances, however, I find it advantageous to use other acid, as for example, where a very fast setting plaster is desired. For such I use hydro-chloric and find the resultant plaster very strong and having a very rapid set. When HCl treatment is used in neutralization by calcium hydroxide, CaCl is formed which is very soluble and hence easily eliminated. Without committing myself to theory I would point out the probable formation of calcium fluosilicate which precipitated in small amounts is believed to act as a stucco accelerator. As pointed out, other mineral acids may be used in amounts depending on their acidity.

As before stated, I also believe that the acid should be used in excess and I find that an excess of at least 1% based on the dry weight of the gypsum treated is necessary for the best results. I do not wish to be limited to exact proportions, but I point out that degree of excess as one of considerable practical importance. I also prefer lime as a neutralizing agent and as above indicated have preference for calcium hydrate as being the most satisfactory form, but here again the neutralizing base or salt might be varied without departing from the spirit of my invention. In some instances Portland cement might be added as a neutralizing agent. Other agents could be used for neutralizing, but such would be more expensive, as for example, if caustic potash or some form of basic potash salt were employed. I have not attempted to enumerate obvious chemical equivalents as those would be immediately apparent to one skilled in the art.

What I therefore claim and desire to secure by Letters Patent is:—

1. The treatment of nodular crystalline by-product gypsum having a persistent calcium phosphate compound reverted to acid reaction by heat, which consists in decomposing such compound with an excess of sulphuric acid, and in neutralizing the acid magma.

2. In the treatment of by-product gypsum from phosphoric acid manufacture to improve the crystalline strength of plaster made therefrom, those steps which consist in converting the impurities in the by-product by a mineral acid treatment into acids of the impurities treated by adding an excess of the converting acid, and in neutralizing the resultant acidity.

3. In the treatment of by-product gypsum from phosphoric acid manufacture to improve the crystalline strength of plaster made therefrom, those steps which consist in attacking the impurities remaining from the original phosphate material with sulphuric acid in slight excess of the amount required to react with said impurities, and in neutralizing the acid magma.

4. The treatment of nodular crystal form of by-product gypsum produced from phosphoric acid manufacture and containing compounds which are rendered deleterious to the ultimate product produced by dehydration of the gypsum, which consists in attacking such compounds with sulphuric acid in sufficient amount to decompose said compounds into their acid salts and leaving an excess of sulphuric acid, and in then neutralizing with lime the free acids formed as well as the excess of sulphuric acid.

5. The treatment of by-product gypsum produced from phosphoric acid manufacture which has been precipitated in nodular crystalline form, and which contains small amounts of compounds of calcium phosphate, calcium fluoride, mixtures of calcium phosphate and calcium fluoride or other fluorine compounds, which consists in attacking such compounds with sulphuric acid in excess of the required amounts to decompose the compounds present in the by-product gypsum into free phosphoric acid and free hydrofluoric acid, and then in neutralizing with lime the acids formed and the excess of sulphuric acid used.

6. The treatment of by-product gypsum produced from phosphoric acid manufacture which has been precipitated in mixed crystalline form and which contains small amounts of compounds of calcium phosphate, calcium fluoride, mixtures of calcium phosphate and calcium fluoride or other fluorine compounds which are rendered reactive by heat, which consist in attacking such compounds with sulphuric acid in excess of the required amounts to decompose the compounds present in the by-product gypsum into free phosphoric acid and free hydrofluoric acid, and then in neutralizing with lime the acids formed and the excess of sulphuric acid used to convert them into stable compounds not rendered reactive by heat.

7. The process of treating by-product gypsum produced from the manufacture of phosphoric acid having a compound subject to acid reversion by heat of dehydration of the gypsum, which consists in treating the gypsum with a mineral acid in excess of the amount required to decompose the compound which is rendered deleterious to the ultimate product produced by dehydration of the gypsum, and in neutralizing the acids produced to compounds not rendered reactive by the heat of dehydration of the gypsum.

8. In the process of treating by-product gypsum, having compounds which develop acidity upon dehydration of the gypsum, those steps which consist in treating with sulphuric acid in excess of the amount required to decompose the compounds present and in neutralizing the free acids of the compounds and the excess sulphuric acid with lime.

9. In the proces of treating by-product gypsum to improve the crystal structure of the plaster made therefrom, such by-product gypsum being deficient in crystal growth and containing impurities which in the form of gypsum are non-deleterious but which are rendered actively deleterious to the plaster by the heat of dehydration of the gypsum, those steps which consist in treating the gypsum with sulphuric acid in excess of the amount required to react with and decompose the impurities which are rendered deleterious by the heat of dehydration of the gypsum, and then neutralizing the acids of the deleterious impurities and the excess sulphuric acid with lime to convert them into stable compounds not rendered reactive by heat.

10. In the process of treating by-product gypsum produced from the manufacture of phosphoric acid having a compound which develops acidity upon dehydration of the gypsum, those steps which consist in converting such compound by acidulation into free acid, and in neutralizing the free acid so formed.

In testimony whereof I affix my signature.

ROBERT SEAVER EDWARDS.